US009491627B2

(12) United States Patent
Walrath (10) Patent No.: US 9,491,627 B2
(45) Date of Patent: Nov. 8, 2016

(54) RECOVERING DATA IN A STORAGE MEDIUM OF AN ELECTRONIC DEVICE THAT HAS BEEN TAMPERED WITH

(75) Inventor: Craig A. Walrath, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 944 days.

(21) Appl. No.: 13/259,412

(22) PCT Filed: Jan. 14, 2010

(86) PCT No.: PCT/US2010/020967
§ 371 (c)(1),
(2), (4) Date: Sep. 23, 2011

(87) PCT Pub. No.: WO2011/087499
PCT Pub. Date: Jul. 21, 2011

(65) Prior Publication Data
US 2012/0023589 A1    Jan. 26, 2012

(51) Int. Cl.
| G06F 12/14 | (2006.01) |
| G08B 29/00 | (2006.01) |
| H04W 12/12 | (2009.01) |
| G06F 21/55 | (2013.01) |
| G06F 21/86 | (2013.01) |
| G06F 21/88 | (2013.01) |
| G06F 21/78 | (2013.01) |
| G06F 21/70 | (2013.01) |

(52) U.S. Cl.
CPC ............ *H04W 12/12* (2013.01); *G06F 21/554* (2013.01); *G06F 21/86* (2013.01); *G06F 21/88* (2013.01); *G06F 21/70* (2013.01); *G06F 21/78* (2013.01)

(58) Field of Classification Search
CPC ......... G06F 21/86; G06F 21/70; G06F 21/78
USPC ............................ 726/26, 34; 713/193, 194
See application file for complete search history.

(56) References Cited

U.S. PATENT DOCUMENTS

| 2007/0043967 A1* | 2/2007 | Stone-Kaplan et al. ......... 714/4 |
| 2007/0101131 A1* | 5/2007 | Davtchev et al. ............ 713/166 |
| 2008/0233919 A1* | 9/2008 | Kenney ........................ 455/411 |

FOREIGN PATENT DOCUMENTS

| JP | 2002325280 | 11/2002 |
| JP | 2007156986 | 6/2007 |
| KR | 1020060067865 | 6/2006 |

OTHER PUBLICATIONS

International Searching Authority, International Search Report and Written Opinion, Appln No. PCT/US2010/020967, date of mailing Aug. 3, 2010, 10 p.
Absolute Software, Computrace Complete—Product Data Sheet, 2009 (2 pages).

(Continued)

*Primary Examiner* — Aravind Moorthy
(74) *Attorney, Agent, or Firm* — Trop, Pruner & Hu (57) ABSTRACT

To recover data, tampering of an electronic device that stores data in a storage medium of the electronic device is detected. A recovery procedure receives information relating to prioritizing of types of the data, and the recovery procedure detects a communication link. The recovery procedure sends the data over the communication link for transfer to a recovery destination, wherein the data is sent in an order according to the information relating to prioritizing of the types of the data.

15 Claims, 5 Drawing Sheets

(56) References Cited

OTHER PUBLICATIONS

Brigadoon Security Group, PC Phone Home—Tracks & Locates Missing Computers dated on or before Oct. 2009 (1 page).
YOST MyLaptpGPS Blog, Protecting Your Laptop Assets—How MyLaptopGPS Works dated Oct. 2009 (2 pages).
NextAdvisor.com/blog—How to deal with a lost or stolen laptop, Jul. 2008 (6 pages).
www.xtool.com—The XTool Advantage dated on or before Oct. 2009 (3 pages).
Netlobo.com, Stolen Laptop Recovery and Data Destruction, Oct. 18, 2007 (2 pages).

* cited by examiner

RECOVERING DATA IN A STORAGE MEDIUM OF AN ELECTRONIC DEVICE THAT HAS BEEN TAMPERED WITH

CROSS-REFERENFCE TO RELATED APPLICATION

This application is a national stage application under 35 U.S.C. §371 of PCT/US2010/020967, filed 14 Jan. 2010.

BACKGROUND

As portable electronic devices (such as portable computers, personal digital assistants, mobile telephones, and so forth) have proliferated, the issue of theft of such electronic devices has become a concern. The storage capacities of electronic devices have increased to such a level that relatively large amounts of data can be stored in such electronic devices. When an electronic device is stolen, then any confidential or personal information in the electronic device may become compromised.

BRIEF DESCRIPTION OF THE DRAWINGS

Some embodiments of the invention are described with respect to the following figures.

DETAILED DESCRIPTION

In typical electronic devices (including desktop computers, portable computers, personal digital assistants, mobile telephones, and so forth), there can be relatively large amounts of confidential and/or personal information stored in persistent storage media of the electronic devices. Examples of confidential information can include confidential business or technical information. Examples of personal information may. include social security numbers, bank account numbers, credit card numbers, and so forth. If the electronic device is stolen, or alternatively, if the storage medium of the electronic device is removed from the electronic device, then any data stored in the storage medium may be accessed and used for an unauthorized purpose. In addition, the user of the electronic device may not have kept a backup of the data, or alternatively, the backup of the data may be incomplete. Certain existing systems or services have the capability of disabling a lost or stolen electronic device to prevent unauthorized access of the information in the electronic device. However, in many cases, the owner of the electronic device values the information contained in the electronic device more than the electronic device itself. In such situations, using conventional systems or services, the user of the electronic device may not be able to efficiently recover the data that is on the storage medium of the electronic device that has been tampered with.

In accordance with some embodiments, a technique or mechanism is provided to allow for recovery of data on a storage medium of an electronic device that has been tampered with. An electronic device is considered to be tampered with if any one or more of the following conditions occur: the electronic device is stolen; the storage medium of the electronic device is removed; a locking mechanism that attaches the electronic device to a particular location (e.g., furniture or other fixed object) is removed; software of the electronic device is tampered with; the electronic device moves beyond a particular physical region; a user, organization, and/or service sends notification to the electronic device to indicate that the electronic device has been compromised or stolen (e.g., such as in the scenario where an employee has terminated employment with a company but has not returned the electronic device to the company); at least a portion (e.g. hardware or software) in the electronic device has been opened without sufficient authorization/authentication (e.g., wrong password used); and so forth.

The electronic device contains a recovery mechanism (in the form of hardware only or hardware plus recovery software or firmware) that is able to detect tampering of the electronic device. In response to detection of such tampering, the recovery mechanism can be invoked to start a recovery procedure to allow for certain data on the storage medium of the tampered electronic device to be transmitted over a communication link to a location outside the electronic device, where the data ultimately is transferred to a predefined recovery destination (which can be remote from where the electronic device or storage medium is located). For example, the recovery destination can be a server, a desktop computer, a notebook computer, or other type of electronic device.

If the recovery mechanism is implemented with recovery code, the recovery code can be stored on the same storage medium as the data, or alternatively, the recovery code can be stored in a separate storage medium. The recovery procedure can be performed by hardware alone (no software), or can be performed by a combination of hardware and software.

Also, the recovery destination can have default settings initially, where the default settings can be updated later, such as during initial configuration of the recovery procedure, or at any time prior to electronic device being tampered with. In addition, new information relating to the recovery destination could be received over a wired or wireless connection after the electronic device has been tampered with.

The recovery procedure includes the recovery mechanism receiving information relating to prioritizing of types of data. Note that the storage medium can store a relatively large amount of data, such that it would be desirable to define which types of data are more important than other types of data. For example, example types of data that may be more important than other data include financial data, work documents, pictures, videos, and so forth. Also other types of prioritization can be used separately or in conjunction with the prioritization noted above. Such other type of prioritization can include: prioritization based on most recently updated information (based on date, time, etc); prioritization based on whether information has been backed up; prioritization based on based on user (such as in scenarios where there are multiple users on an electronic device such that there are multiple partitions or folders for the different users); prioritization based on categories of information (such as work information versus personal information); and so forth. In the ensuing discussion, "information relating to prioritizing of the types of data" refers to any one or multiple of the prioritizations noted above.

The information relating to prioritizing of the types of data can be stored locally on the storage medium or in other hardware of the electronic device, or alternatively, the information relating to prioritizing of the types of data can be received by the recovery mechanism through a network connection or link to another device after tampering of the electronic device has been detected. The prioritization information can have default settings initially, which can be updated (such as by a user, system, administrator, service, company, owner at various points (such as during initial configuration of the recovery procedure, at any time prior to the electronic device being tampered with, and so forth). Updated prioritization information can be received over a wired or wireless link after the electronic device has been tampered with.

In the recovery procedure, the recovery mechanism detects if a communication link is available to allow for communication of data over the communication link to a location outside the electronic device. The communication link can be an established network connection over a network. Alternatively, the communication link can be a link to another electronic device (which can be directly connected to the tampered electronic device). Examples of such direct connection include a Universal Serial Bus (USB) connection, a Bluetooth wireless connection, a connection through parallel or serial ports, or any other type of wired or wireless connection between electronic devices. If a communication link is not available, the recovery mechanism in some embodiments is able to automatically establish a communication link (e.g., turn on a wireless connection) when possible either directly over a network or indirectly through another connected device (e.g., a computer, personal digital assistant, etc.) that has or will have a network connection.

In response to detecting presence of a communication link, the recovery mechanism receives the data type prioritization information (which can be retrieved from a storage medium or received over the communication link). The recovery mechanism then sends the data (in an order according to the data type prioritization information) over the communication link. Note that the data can be sent directly over a network to a recovery destination, or alternatively, the data can be sent to another electronic device for temporary storage on the other electronic device for later transfer to the recovery destination. In some examples, the order in which data is sent in the following order: most recently modified data, data that has not been backed up, financial data, work documents, other types of documents such as pictures, videos, and so forth. Note that different combinations of prioritization can be used as noted above. If no prioritization set up, then a default prioritization can be used.

The recovery mechanism can be performed in the electronic device that has been tampered with. Alternatively, the recovery mechanism can be performed in another electronic device, such as in the scenario where the storage medium has been removed from the electronic device that has been tampered with and installed in such other electronic device.

In the ensuing discussion, embodiments are described where the recovery procedure is performed by recovery code; however, as noted above, the recovery procedure can be performed by hardware, or a combination of hardware and firmware, in other embodiments.

Figure 1A:
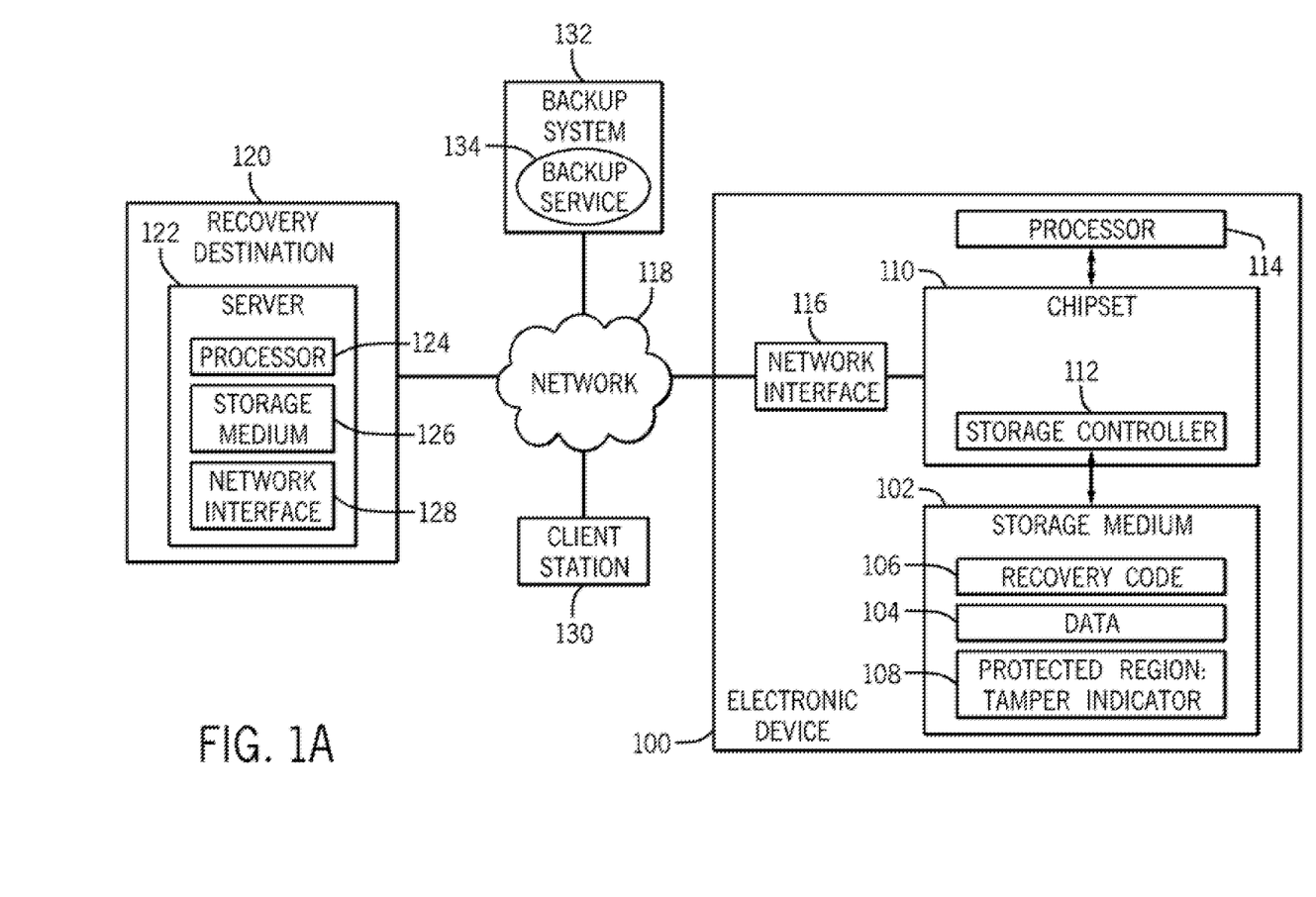
FIGS. 1A, 1B, and 2 are block diagrams of example arrangements that incorporate various embodiments of the invention.

FIG. 1A is a block diagram of an example arrangement that includes an electronic device 100 having a storage medium 102 that contains data 104 and recovery code 106. As further shown in FIG. 1A. the storage medium 102 can store a tamper indicator 108 in a protected (secure) or hidden region of the storage medium 102. Alternatively, the tamper indicator 108 can be stored elsewhere. A protected or hidden region (also referred to as hidden partition) of a storage medium is a region that is not accessible (without proper authorization) by application software or the operating system of the electronic device 100. The electronic device 100 can be provided with separate secure code, such as in an operating system, in firmware, in a device driver, or in a special application, that is able to access the protected or hidden region with appropriate authorization/authentication. The tamper indicator 108 can be set to a predetermined value to indicate that the electronic device 100 has been tampered with. Setting of the tamper indicator 108 can be performed by a tamper detection hardware in the chipset 110, or alternatively, by the recovery code 106.

In alternative embodiments, the recovery procedure upon detecting tampering of the electronic device 100 can also store the data 104 (or a subset of the data 104) in the protected region. The data stored in the protected region can be later transmitted when possible, or the data stored in the protected region can be later recovered if the electronic device 100 is found or returned to the owner. Storing of the data in the protected region preserves the data so that even if portions of the storage medium 102 are deleted, the data in the protected region can still be there for later recovery. The protected region can be in the storage medium 102, or on a different storage medium. Note that in some implementations not all of the data to be recovered would be stored in the protected region—in such implementations, the recovery procedure can recover some data from the protected region and the remaining data from outside the protected region.

Examples of data portions that may be stored in the protected region may be confidential data and/or personal data that the user may not wish to be viewed by a non authorized user. Collectively, the confidential data and personal data are referred to as "sensitive data." In other implementations, additional data portions can be stored in the protected region.

The recovery code 106 can also be stored in the protected region. A benefit of storing the recovery code 106 and at least some portion of the data 104 (such as sensitive data) in the protected region is that a person who has stolen the electronic device 100 or storage medium 102 would not be able to view or have access the recovery code 106 and at least some portion of the data 104.

The electronic device 100 also includes a chipset 110 that has a storage controller 112 for managing access of the storage medium 102. The chipset 110 can also include other controllers (not shown), such as controllers connected to input/output (I/O devices), a video controller, and/or other controllers. In addition, the electronic device 100 also includes a processor 114, on which various software in the electronic device 100 is executable. One example of such software is the recovery code 106, which can be loaded from the storage medium 102 for execution on the processor 114 in response to detection of tampering of the electronic device 100.

The electronic device 100 also includes a network interface 116 to allow the electronic device 100 to communicate over a network 118, such as a wireless network, wired network, or a combination of a wireless or wired network. Although referenced as a singular "network," it is noted that the term "network" is intended to cover a single network or multiple networks, with one of such networks being a public network such as the Internet.

A recovery destination 120 is connected to the network 118, where the recovery destination 120 may be a destination identified by a user of the electronic device 100 for transferring designated data of the storage medium 102 in response to detecting that the electronic device 100 has been tampered with. The recovery destination 120 may be provided by a service provider that offers data recovery services to subscribers. There can be just one static recovery destination 120, or there can be multiple recovery destinations that can be dynamically selected for transfer of data from the electronic device 100 that has been tampered with.

In the example of FIG. 1A, upon detection of tampering of the electronic device 100, the recovery code 106 is launched for execution on the processor 114, and the recovery code 106 is able to send designated data over the network 118 to the recovery destination 120, in response to the recovery code 106 detecting a network connection to from the electronic device 100 to the recovery destination 120. Alternatively, instead of sending the designated data directly over the network 118 to the recovery destination 120, the recovery code 106 is able to send the designated data to a second electronic device (that is linked to the electronic device 100). In such a scenario, the designated data can be temporarily stored in the second electronic device for later transfer to the recovery destination 120, or alternatively, the designated data can be routed through the second electronic device to the network 118 for indirect transfer of the designated data from the electronic device 100 to the recovery destination 120. In this latter scenario, the second electronic device can also track location information (e.g., IP address, server address, wireless location, etc.) of the electronic device that has been tampered with.

The recovery destination 120 includes at least one computer server 122 (or some other type of device), which has a processor 124, a storage medium 126, and a network interface 128 to allow the computer server 122 to communicate over the network 118. The designated data that has been transferred from the electronic device 100 to the recovery destination 120 can be stored in the storage medium 126 of the server 122.

The recovered data that is stored in the server 122 can be later retrieved by a client station 130 that is also connected to the network 118. For example, after loss of the electronic device 100, and after receiving an indication that the data of the electronic device 100 has been recovered into the recovery destination 120, the owner of the electronic device 100 can use the client station 130 to retrieve the recovered data from the server 122.

FIG. 1A further shows a backup system 132 connected to the network 118. The backup system 132 includes a backup service 134 that causes at least some portion of the data 104 in the storage medium 102 of the electronic device 100 to be stored in the backup system 132. In the case where portions of the data 104 in the electronic device 100 are backed up, the recovery code 106 when launched will interact with the backup service 134 to determine which parts of the data 104 that a user has designated to be recovered have not been backed up. The recovery code 106 will then attempt to recover the part of the data 104 that has not already been backed up by the backup service 134. By first checking which part of the data 104 has already been backed up, the recovery procedure does not have to waste time and network resource transmitting data that is already available elsewhere (e.g., the backup system 132).

Alternatively, backup information indicating which portions of the data 104 have already been backed up can be stored locally in the electronic device 100, such that the recovery code 106 does not have to interact with the backup service 134 during the recovery procedure. For example, the backup information can be stored in the protected region of the storage medium 102—this backup information can be downloaded from the backup service 134 during normal operation of the electronic device 100.

Figure 1B:
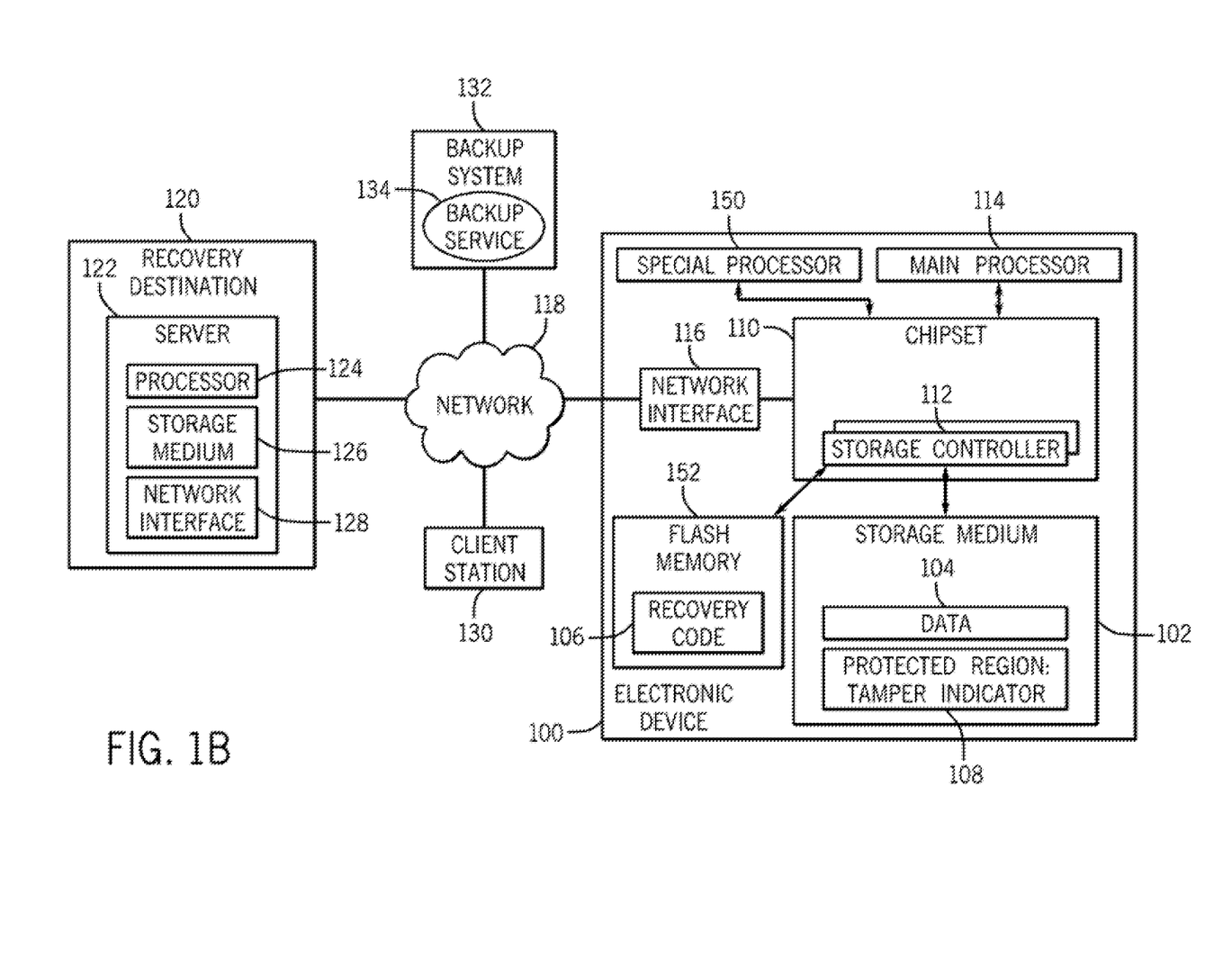

FIG. 1B depicts an alternative embodiment of the electronic device 100. In the electronic device 100 of FIG. 1B, in addition to the components depicted in FIG. 1A (which share the same reference numerals), a flash memory 152 and a special processor 150 are provided. In the FIG. 1B embodiment, the recovery code 106 is stored in the flash memory 152. The protected region (including the tamper indicator 108) can also alternatively be stored in the flash memory 152 instead of in the storage medium 102.

The special processor 150 is provided to disable the electronic device 100 in response to detection of tampering of the electronic device 100. Disabling the electronic device 100 prevents unauthorized use of the electronic device 100; however, the recovery procedure according to some embodiments can still be performed.

Figure 2:
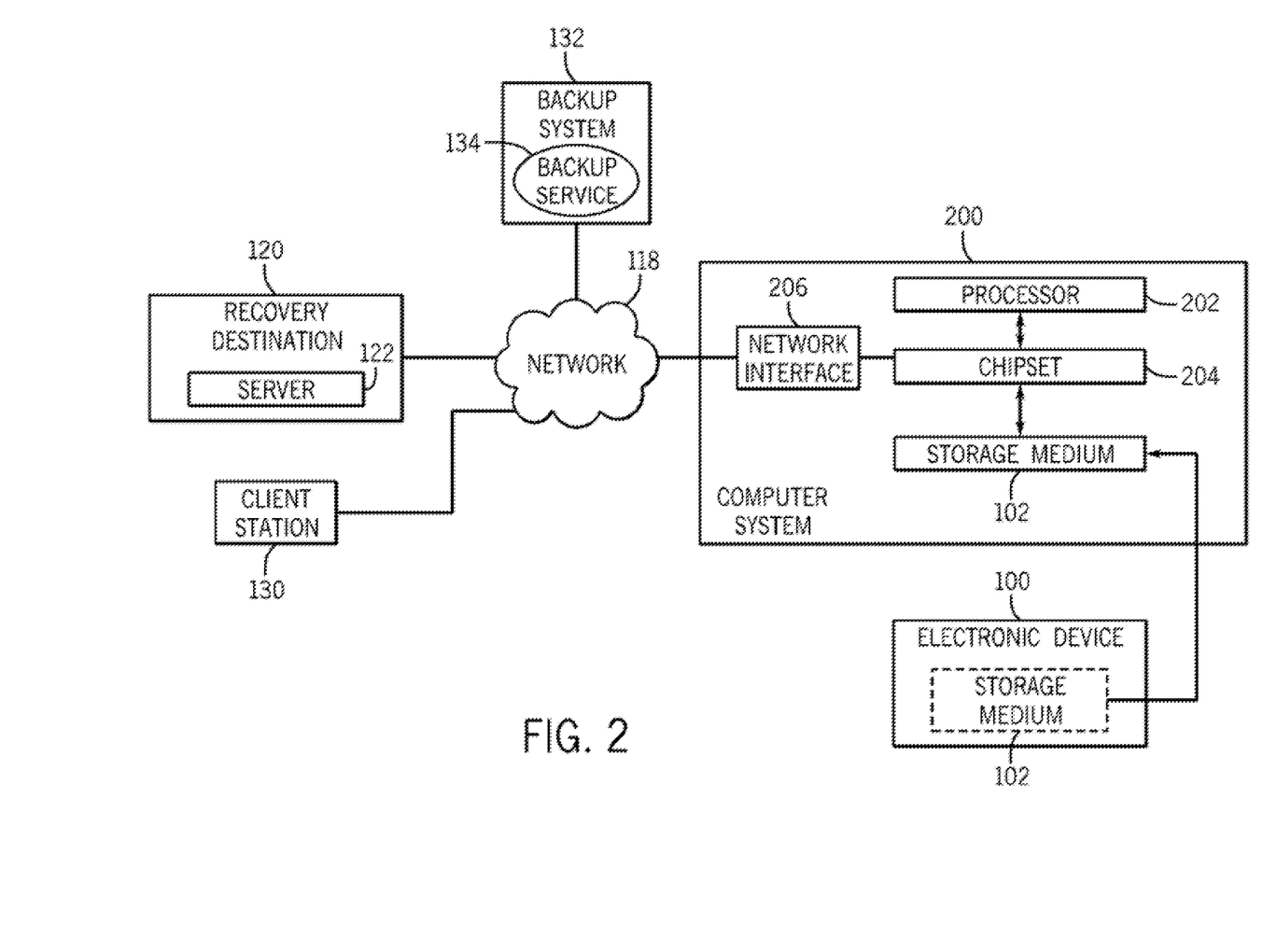

FIGS. 1A and 1B illustrate embodiments in which it is assumed that the entire electronic device 100 is stolen, such that the recovery code 106 on the storage medium 102 is launched for execution on the processor 114 of the electronic device 100. Alternatively, it is also possible that a thief will remove just the storage medium 102 from the electronic device 100, and install the storage medium 102 in another system. An example of such a scenario is shown in FIG. 2, where the storage medium 102 has been removed from the electronic device 100 and installed in a computer system 200. Note that although the storage medium 102 has been removed from the electronic device 100, the recovery code 106 and the data 104 are still on the storage medium 102. The recovery code 106 can detect tampering associated with the electronic device 100, since the recovery code 106 can detect that the storage medium 102 has been removed from the electronic device 100 and is now in a different host (namely the computer system 200 instead of the electronic device 100).

In this scenario, the recovery code 106 would be launched for execution on a processor 202 of the computer system 200, and a recovery procedure can be performed by the recovery code 106 in the computer system 200 to recover data from the storage medium 102, where the recovered data is sent to the recovery destination 120 over the network 118.

The computer system 200 also includes a chipset 204 and a network interface 206 to allow the computer system 200 to communicate over the network 118.

Figure 3:
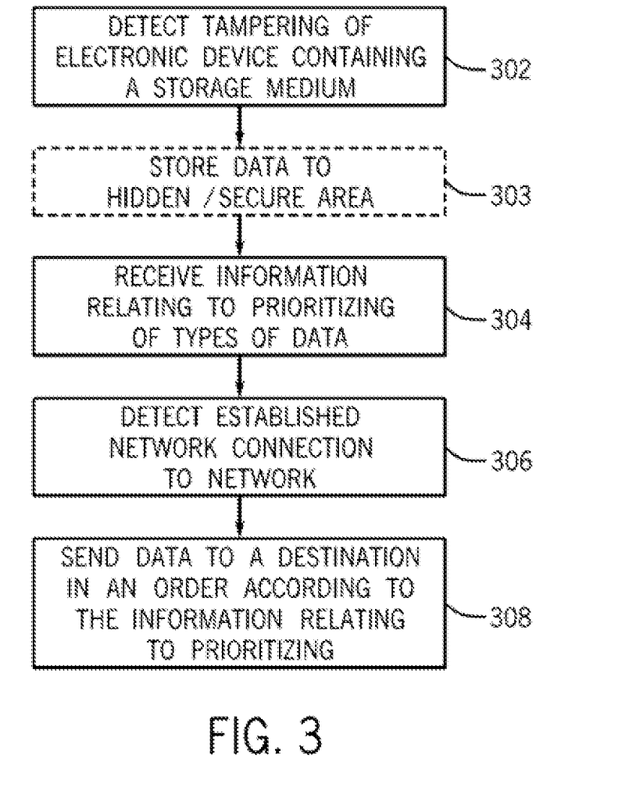
FIG. 3 is a flow diagram of a general process of recovering data, according to an embodiment.

FIG. 3 is a flow diagram of a process according to an embodiment. The process of FIG. 3 may be performed by the recovery code 106, whether executed on the processor 114 of the electronic device or the processor 202 of the computer system 200. In an alternative embodiment, instead of performing the recovery procedure under control of the recovery code 106 on the storage medium 102, the chipset 110 (in the FIG. 1A embodiment) or the special processor 150 (in the FIG. 1B embodiment) can be the one that performs the recovery procedure. More generally, the recovery procedure can be performed by a recovery mechanism that can be hardware-only, hardware plus software, or hardware plus firmware.

In FIG. 3, the recovery procedure detects (at 302) tampering of the electronic device 100 that contains the storage medium 102. For example, if the electronic device 100 was tampered with, then the tamper indicator 108 can be set in the storage medium 102, such that this tamper indicator can be later used for tamper detection.

In response to detecting tampering, in some implementations, the recovery procedure can store (at 303) certain data into the hidden or secure region. The data in the hidden or secure region can be later communicated to a recovery location.

The recovery procedure also receives (at 304) information relating to prioritizing of types of the data 104 on the storage medium 102 to recover. The information can be received from the recovery server 122 (or another remote location) when the electronic device 100 or computer system 200 establishes a network connection over the network 118. Such data type prioritization information can be pushed by the recovery server 122 to the electronic device 100 or computer system 200, or the data type prioritization information can be requested (pulled) by the recovery procedure. Alternatively, the data type prioritization information can be pre-stored locally in the storage medium 102, such that the data type prioritization information can be retrieved locally from the storage medium 102. The locally pre-stored prioritization information can be updated during the recovery procedure prior to use.

The recovery procedure detects (at 306) an established network connection on the network 118. Note that in embodiments in which the data type prioritization information is received from a remote location, the detection (306) of the established network connection is performed first before receiving the data type prioritization information.

Upon detecting the established network connection, the recovery procedure sends (at 308) data to the recovery destination 120 in an order according to the data type prioritization information. In a different embodiment, instead of the data 104 in the storage medium 102 being pushed to the recovery destination 120, the data 104 can be pulled by the computer server 122 of the recovery destination 120 from the storage medium 102.

In alternative embodiments, instead of detecting an established network connection on the network 118, the recovery procedure can detect another type of communication link, such as a link to another electronic device that has an established network connection. In this scenario, the data to be transferred to the recovery destination 120 is routed through the other electronic device.

Figure 4:
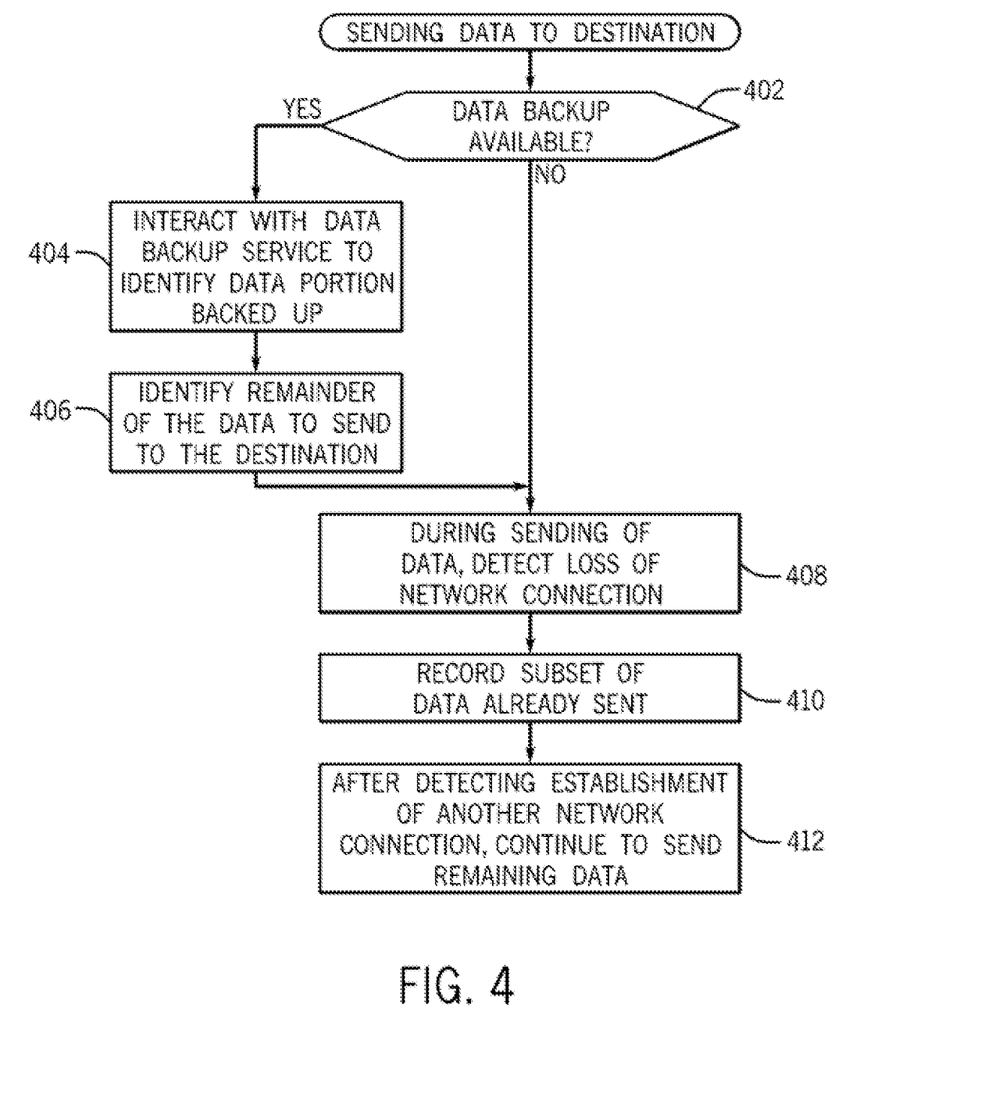
FIG. 4 is a flow diagram of a process of sending data recovered from the storage medium of an electronic device that has been tampered with, according to an embodiment.

FIG. 4 is a flow diagram of the details, according to some embodiments, relating to sending data to the recovery destination 120. The recovery procedure may determine (at 402) whether data backup is available for the data in the storage medium 102. If so, the recovery procedure interacts (at 404) with the backup service 134 (FIG. 1 or 2) to identify a portion of the data 104 that has already been backed up at the backup system 132. Any data portion that has been backed up does not have. to be recovered from the storage medium 102. In a different implementation, interaction with the backup service 134 does not have to be performed if backup information was previously obtained. Next, the recovery procedure identifies (at 406) the remainder of the data 104 that has been designated to be sent to the destination, where the identified data is different from a data portion that has already been backed up.

The data that is sent to the recovery destination 120 can thus be the entirety of the data 104 on the storage medium 102, some designated portion of the data 104, or a portion of the data 104 that has not already been backed up.

During sending of data, the recovery procedure is able to detect (at 408) loss of the network connection (or other communication link). For example, if the electronic device 100 or computer system 200 uses a wireless network connection (or other communication link), the user may have moved out of the wireless coverage region. Alternatively, the user may have powered off the elctronic device 100 or computer system 200 (or placed the electronic device 100 or computer system 200 into a sleep or standby state) prior to all of the designated data being recovered from the storage medium 102 to the recovery destination 120.

Upon detecting loss of network connection (or other communication link), the recovery procedure records (at 410) the subset of data that has already been sent to the recovery destination 120. After detecting establishment of another network connection (or other communication link), the recovery procedure continues (at 412) to send the remaining data to the recovery destination 120 (directly or indirectly).

In some embodiments, it is possible that the storage medium 102 is locked upon tamper detection such that access can only be performed by the owner of the electronic device 100 or a service with appropriate privileges. This is to prevent unauthorized access (by an accessor such as an unauthorized person or application) of content of the storage medium 102. Also, as data portions are recovered and sent to the recovery destination 120, such data portions on the storage medium 120 can be deleted (cleansed) such that the data portions are no longer available.

In some implementations, recovery of data on the storage medium 102 is possible even if the storage medium 120 is reformatted or the data 104 is deleted. In such scenario, recovery of the data 104 (or some portion of the data 104) is still possible, since the data may still be resident on the storage medium 104.

By employing some embodiments of the invention, a user whose electronic device has been tampered with can still recover data in the storage medium of the electronic device. In many instances, the user's data is more valuable to the user than the electronic device itself. In addition, by prioritizing data that is recovered, the most important (from the user's perspective) data is recovered first.

Instructions of software described above (including the recovery code 106 of FIG. 1A or 1B) are loaded for execution on a processor (such as processor 114, 150, or 120 in FIG. 1A, 1B, or 2). The processor can include one or more microprocessors, microcontrollers, processor modules or subsystems (including one or more microprocessors or microcontrollers), or other control or computing devices. A processor can also include other types of hardware devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of recovering data, comprising:
   detecting tampering of an electronic device that stores data in a storage medium of the electronic device;
   starting a recovery procedure in response to detecting the tampering;
   receiving, by a processor in performing the recovery procedure, information relating to prioritizing of types of the data;
   detecting, by the processor in performing the recovery procedure, a communication link; and
   sending, by the processor in performing the recovery procedure, the data over the communication link for transfer to a recovery destination, wherein the data is sent in an order according to the information relating to prioritizing of the types of the data; and
   storing at least some of the data into a protected region in response to detecting tampering of the electronic device, wherein sending the data comprises sending the at least some of the data from the protected region.

2. The method of claim 1, wherein detecting the tampering comprises detecting any one or more of:
   removal of the storage medium from the electronic device;
   removal of a locking mechanism attaching the electronic device to a particular location;
   software tampering in the electronic device;
   movement of the electronic device beyond a particular physical region; and
   at least a portion in the electronic device has been opened without sufficient authorization or authentication.

3. The method of claim 1, further comprising:
   detecting loss of the communication link before completing the sending of the data to the recovery destination;
   recording identification of a subset of the data that has already been sent;
   after detecting establishment of another communication link, continuing to send a remainder of the data other than the subset.

4. The method of claim 1, further comprising:
   in response to detecting tampering of the electronic device, automatically activating the communication link, wherein detecting the communication link is after activating the communication link.

5. The method of claim 1, wherein detecting the communication link comprises one of:
   detecting a network connection over a network; and
   detecting a link with a second electronic device.

6. The method of claim 1, further comprising:
   accessing backup information provided by a data backup service or provided locally in the electronic device to determine a portion of the data that has been backed up,
   wherein sending the data to the recovery destination comprises sending the data that is no already backed up.

7. The method of claim 1, further comprising:
   locking the storage medium so that an unauthorized accessor is unable to access the data on the storage medium.

8. The method of claim 1, further comprising:
   marking the storage medium as being tampered with by storing an indicator in a hidden region of the storage medium, wherein detecting the tampering is based on the indicator.

9. The method of claim 1, wherein the processor that performs the recovery procedure is in one of the electronic device and a system different from the electronic device.

10. The method of claim 1, wherein the at least some of the data is stored into the protected region that is pad of the storage medium of the electronic device.

11. A system comprising:
    a storage medium to store data; and
    a recovery mechanism configured to:
      detect tampering of an electronic device in which the storage medium is or was located;
      start a recovery procedure in response to detecting the tampering;
      in the recovery procedure, determine an order in which the data is to be communicated to a recovery location, the determined order based on prioritizing of types of the data;
      in the recovery procedure, detect a communication link between the system and another location; and
      in response to detecting the communication link, send, as part of the recovery procedure, the data over the communication link in the determined order for communication to the recovery location;
      store at least some of the data into a protected region in response o the detection of the tampering of the electronic device, and wherein the at least some of the data is sent from the protected region.

12. The system of claim 11, wherein the system comprises the electronic device or a computer system different from the electronic device.

13. The system of claim 11, wherein the recovery mechanism is configured to send the data over the communication link to either the recovery location or to another electronic device that in turn causes communication of the data to the recovery location.

14. The system of claim 11, wherein the protected region is part of the storage medium.

15. The system of claim 11, wherein the recovery mechanism is configured to further:
    as part of the recovery procedure,
    access a backup system to determine a portion of the data backed up at the backup system; and
    identify a remaining portion of the data o be sent in the recovery procedure based on the determined portion that is backed up at the backup system.

* * * * *

UNITED STATES PATENT AND TRADEMARK OFFICE
CERTIFICATE OF CORRECTION

PATENT NO. : 9,491,627 B2  
APPLICATION NO. : 13/259412  
DATED : November 8, 2016  
INVENTOR(S) : Craig A Walrath Page 1 of 1

It is certified that error appears in the above-identified patent and that said Letters Patent is hereby corrected as shown below:

In the Claims

In Column 10, Line 6 approx., in Claim 6, delete "no already" and insert -- not already --, therefor.

In Column 10, Line 20 approx., in Claim 10, delete "pad of" and insert -- part of --, therefor.

In Column 10, Line 39 approx., in Claim 11, delete "o the" and insert -- to the --, therefor.

In Column 10, Line 57 approx., in Claim 15, delete "o be" and insert -- to be --, therefor.

Signed and Sealed this
Thirty-first Day of January, 2017

Michelle K. Lee
*Director of the United States Patent and Trademark Office*